Patented Sept. 8, 1936

2,053,960

UNITED STATES PATENT OFFICE 2,053,960

GAS PURIFYING MATERIAL AND METHOD OF MAKING SAME

Theodore P. Keller, Flushing, N. Y., assignor to Gas Purifying Materials Co., Inc., Long Island City, N. Y., a corporation of New York No Drawing. Application December 29, 1933, Serial No. 704,525

10 Claims. (Cl. 252—2.5)

This invention relates to the production of a material which will effectively remove hydrogen sulphide and other sulphur compounds from gaseous mixtures, such as coal gas, water gas, (illuminating gases) refinery gases, coke oven gases, natural gas and the like and more particularly to the production of iron oxide or iron hydroxide for use in the purification of such gas mixtures.

The gas coming from a gas producer is contaminated with impurities, such as hydrogen sulphide, which must be removed by a purification process before it is fit for use. The purification process generally practiced consists in passing the gas through a bed of suitable material, say, an iron oxide mixed with a carrier or dispersing medium, in particle form, which renders the material porous to the passage of the gas. In the purification of commercial gases, oxide of iron (or the hydroxide) reacts with the hydrogen sulphide in accordance with the familiar reactions:

(1) $Fe_2O_3.(H_2O)x + 3H_2S \rightarrow Fe_2S_3 + 3H_2O + (H_2O)x$
(2) $Fe_2O_3.(H_2O)x + 3H_2S \rightarrow 2FeS + S + 6H_2O$ A gas purifying material has heretofore been proposed in which iron oxide is carried by wood shavings or the like. But a mixture comprising wood particles is highly inflammable and subject to spontaneous combustion both in storage and when in use in the purification box, so called, used in conjunction with the gas producer. It has, therefore, been proposed to make a purification material by filtering mine water through a bed of granulated slag with a resulting accumulation of oxides of iron. This method is inefficient as the iron salts in the mine water must first be oxidized before they will deposit, making the output and working costs of production prohibitive. Such slag is only moderately porous and the precipitation of iron oxide on the slag has filled the pores in the slag so that the surface area offered to the gases to be purified is only that of the surface of the particle. The absorptive power of iron oxide is dependent upon the degree of surface area adapted to be exposed to the gases, the greater area of absorptive medium, the greater efficacy of the material. Such material is, therefore, inefficient as a gas purifying material. Likewise, it has been proposed to use granulated slag mechanically mixed with hydrated iron oxides, some of which are obtained in the course of manufacture of aluminum hydroxide from bauxite, and others have been obtained from natural bog ores. These mechanical mixtures result in an inferior product in that the bog ores and bauxite residues are in most instances only 50% iron oxide the balance being roots, silica and inert matter. It therefore requires twice the amount of material ordinarily used with the result that it is difficult to prevent the hydrated oxide from packing in and filling the interstices of the slag. This condition reduces the active surface area available to the gas to be purified and results in a material of low activity. Another serious disadvantage to a mechanical mixture of this sort is that the oxide is not firmly adhered to the slag particle and if the purification box should lose its moisture, as frequently happens, the oxide has been found to blow from the slag and into the distributing system.

One object of the invention is, therefore, to form a gas purifying material comprising an iron oxide on a non-inflammable or incombustible carrier in particle form which shall adhere to the carrier in use even though moisture conditions are poor. Accordingly, iron is oxidized, in situ, on non-inflammable particles of small size, such as granulated blast furnace slag, preferably formed in a particular manner.

Another object of the invention is a gas purifying material having the optimum degree of surface area exposed to the flowing gases. It is proposed, in accordance with this aspect of the invention, to use a particular form of blast furnace slag, as a carrier for the iron oxide. This is blast furnace slag in granular form, having the characteristics of a mineral sponge. The iron is oxidized, in situ, on the walls of the voids as well as on the surface of the particles and offers the optimum area of active oxide of iron to the gases to be purified.

Heretofore in oxidation processes for this purpose, it has frequently been necessary to retard the oxidation by the addition of an alkali, such as soda ash, otherwise the heat liberated became excessive and an inactive form of the oxide was produced. By the present method, the alkalinity of the carrier retards the oxidation and also results in a less active material. To expedite the oxidation to that degree necessary to produce a material having the proper absorptive capacity, it is proposed, in accordance with this invention, to add during oxidation a catalyst, preferably a water soluble salt, for instance, ammonium chloride, sodium chloride or calcium chloride.

A gas purifying material is further sought which is substantially inactive, to any acids formed in the purification box. The carrier medium of this invention has, therefore, preferably, a large proportion of material inert to these acids, for instance, in excess of 35% silica, which will not react with sulphuric or other acids sometimes formed in the purification box.

The invention also seeks a process of manufacturing the gas purifying material which is practical from the standpoint of ease and economy of operation.

These and other objects of the invention and the means for their attainment will be more apparent from the following detailed description of a preferred embodiment of the invention.

In the production of the gas purifying material of this invention, metallic iron, conveniently ground iron borings, is mixed with a non-inflammable carrier or dispersing medium in relatively small particle size, preferably in equal proportions, by weight, and permitted to oxidize. The dispersing medium or carrier should be non-inflammable or incombustible at the temperatures normally occurring in the purifying boxes in which such gas purifying materials are customarily used. The carrier is, desirably, blast furnace slag, which has, generally, the following approximate analysis:

| | Percent |
|---|---|
| $SiO_2$ | 37 |
| $Al_2O_3$ | 13 |
| $CaO$ | 44 |
| $MgO$ | 4 |
| $S$ | 2 |
| $MnO$ | 2 |
| $Fe$ | 2 |

Preferably, the slag is made by spraying water on molten slag as drawn off from the blast furnace and the steam liberated forms granules having the characteristics of a mineral sponge. The granules are, substantially, 90% voids and are very fragile. They are very light in weight thus facilitating handling and reducing transportation costs. It has been found that a particle size of from one-quarter inch to one inch is best suited to the purpose at hand.

Such a slag absorbs and holds mechanically as high as 52% moisture content but will air dry to as low as 25% to 30% moisture content. Slag with a moisture content as high as 52% cannot be used, however, because when tumbled in a mechanical mixer, the particles break up and liberate water which forms a slurry. The moisture content is, therefore, reduced to approximately 40%. Care must, moreover, be taken in mixing the slag particles and the iron borings, since the particles of slag are fragile and the largest size particle possible, within limits, is desirable. However, it is only necessary, under ordinary conditions, to mix or tumble the mixture of this invention for approximately half the time heretofore required in other processes.

By the tumbling, the iron is distributed over the surface of the particles and on the walls of the voids or pores. The mixture is then oxidized by allowing it to stand and wetting it to that degree necessary to promote oxidation of the iron with the optimum state of hydration. This wetting is possible with the carrier material used since not more than approximately 2% of the slag constituents is soluble in water.

Thus the iron is oxidized in situ, and is well distributed over the surfaces of the porous particles as distinguished from prior attempts to produce a gas purifying material by mixing materials such as bog ore with broken particles of slag. Bog ore contains 50% water and 25% inerts and when this is tumbled, the moisture and the inerts form a slime which spreads over and closes the pores of the carrier material and reduces materially the affective area of oxide of iron which would be exposed to the gases. Where attempts have been made to mix previously formed iron oxide with a porous carrier medium, as by tumbling, the iron oxide has packed in the pores and exposed less surface area to the gases.

The oxidation process must proceed at a definite rate and within a closely confined temperature range. Since the oxidation of iron is a definitely exothermic reaction, it has been found that with a bed of carrier material of such a porous character, the depth of the oxidation bed must be regulated to retain as much heat as is required for the most active form of the oxide. As now practiced, a bed of a depth of about eighteen inches is preferred.

If it is found that external conditions, such as cold weather, retards the oxidation, thereby producing an inferior oxide, the oxidation may be accelerated by the addition to the mixture of a catalyst, such as a water soluble salt, for instance, ammonium chloride, sodium chloride or calcium chloride.

Modern gas practice now uses cheap oils, such as Bunker "C" oil which is high in sulphur. This produces high acidity in the purification box and it has heretofore been necessary to add an alkali such as lime to the mixture introduced into the purification box for efficient purification. In the product of this invention, the entire slag particle being substantially alkaline, the material is in an ideal state for the purification of gases made with such oils since the alkali is in intimate contact with the iron and is permanent while added lime washes out of the mixture in the drip. Thus the formation of non-revivifiable polysulphides is prevented without necessitating additional reagents. Moreover, if ammonium chloride has been selected as the catalyst, it will react with the calcium oxide in the slag and liberate ammonia, which, with the water present in the slag, will precipitate any iron salts that have been formed in the oxidation. The ammonical condition is advantageous as it assists in the removal of cyanogen compounds.

By mixing the iron borings with the slag particles and oxidizing the iron in situ in the manner described, the iron oxide or hydroxide is not only evenly distributed over the surface of the particle and over the walls of the voids or pores thereof, but clings or adheres firmly thereto. Thus even when proper moisture conditions in the purification box are lacking, the oxide will not blow off the particle and enter the distributing system. Moreover, by the method proposed, the production of the purifying material may be regulated to attain the most effective impurity-absorbing oxide, since there are no inerts but all active iron oxide. Since the carrier is non-inflammable, all danger of fire is avoided, and being extremely light in weight, the gas purifying material is easy to handle and can be transported at minimum cost.

Various modifications will occur to those skilled in the art in the composition and configuration of the carrier material, as well as in its method of manufacture as also in the method of oxidizing iron in situ thereon, and no limitation is intended by the phraseology of the foregoing description.

What is claimed is:—

1. A gas purifying material comprising iron oxidized in situ on porous particles of incombustible material.

2. A gas purifying material comprising iron oxidized in situ on particles previously formed by spraying water on molten blast furnace slag.

3. A gas purifying material manufactured by mixing iron particles with porous particles having a silica content sufficient to impart incombustibility, wetting said mixture and permitting the iron to oxidize in situ.

4. A gas purifying material manufactured by mixing iron particles with incombustible porous particles, wetting the mixture and permitting the iron to oxidize in situ.

5. A gas purifying material manufactured by mixing iron with particles formed by water sprayed on blast furnace slag in molten condition, wetting the mixture and permitting the iron to oxidize in situ.

6. The method of manufacturing a gas purifying material comprising mixing iron particles with porous particles having a silica content sufficient to impart incombustibility and oxidizing the iron.

7. The method of manufacturing a gas purifying material comprising mixing iron particles with porous particles of non-inflammable material and oxidizing the iron.

8. The method of manufacturing a gas purifying material comprising mixing iron with incombustible porous particles and oxidizing the iron.

9. The method of manufacturing a gas purifying material comprising mixing iron with particles formed by spraying water on molten blast furnace slag and oxidizing the iron.

10. The method of manufacturing a gas purifying material which comprises oxidizing iron particles in situ upon porous particles having a silica content sufficient to impart incombustibility in the presence of moisture and regulating the depth of the bed of particles during oxidation.

THEODORE P. KELLER.